May 25, 1926.
E. M. PELS
1,585,871
COLLAPSIBLE LUGGAGE CARRIER FOR VEHICLES
Filed Feb. 16, 1925
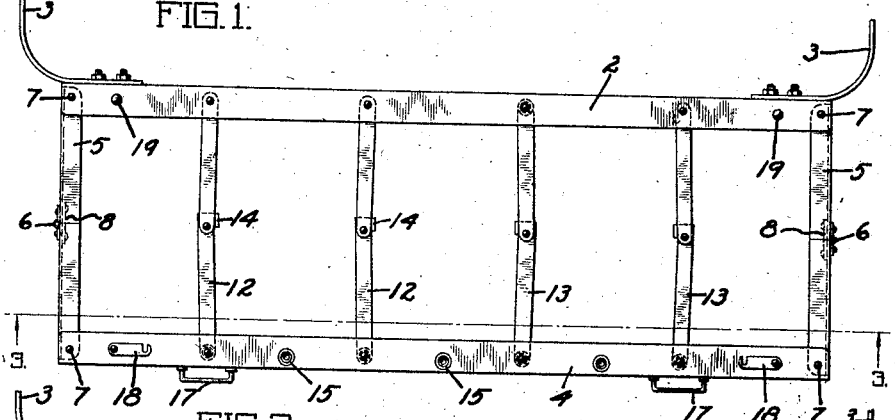
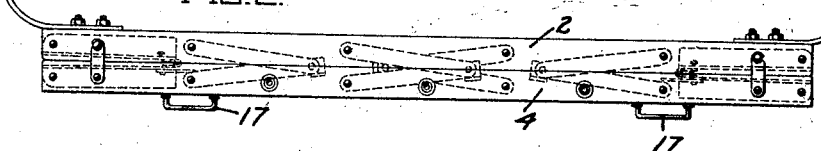
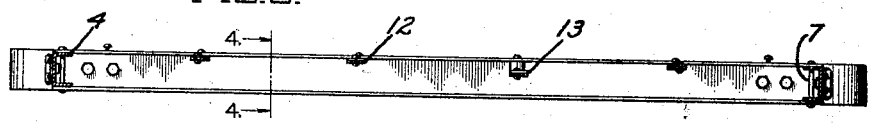
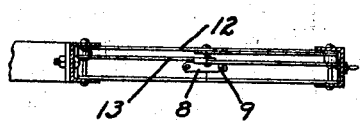
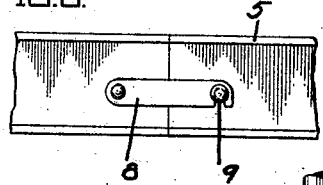
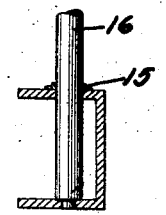
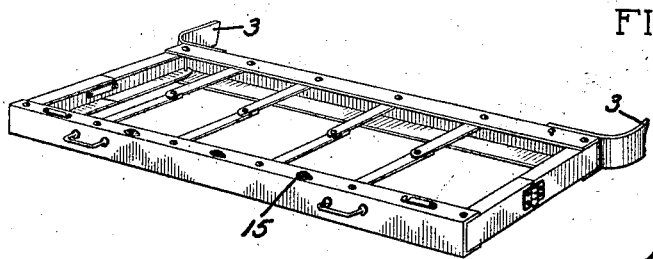
INVENTOR
Edward M. Pels.
BY
HIS ATTORNEYS Patented May 25, 1926.

1,585,871

UNITED STATES PATENT OFFICE.

EDWARD M. PELS, OF SAN FRANCISCO, CALIFORNIA.

COLLAPSIBLE LUGGAGE CARRIER FOR VEHICLES.

Application filed February 16, 1925. Serial No. 9,385.

The invention relates to luggage carriers for vehicles and particularly to a collapsible luggage carrier adapted to be secured to the rear end of an automobile frame and extend across the rear end of the automobile.

An object of the invention is to provide a collapsible luggage carrier, which, in its collapsed position is not unsightly and which, in such position, serves as a bumper.

Another object of the invention is to provide a collapsible luggage carrier for vehicles which may be readily moved from collapsed to extended position by horizontal movement.

Another object of the invention is to provide a collapsible luggage carrier which may be latched in collapsed position and in extended position.

The invention possesses other advantageous features, some of which with the foregoing, will be set forth at length in the following description, where I shall outline in full that form of the invention which I have selected for illustration in the drawings accompanying and forming part of the present specification. In said drawings I have shown one form of luggage carrier embodying my invention, but it is to be understood that I do not limit myself to such form, since the invention, as set forth in the claims, may be embodied in a plurality of forms.

Referring to said drawings:

Figure 1 is a plan view of the luggage carrier of my invention in extended position.

Figure 2 is a plan view of the luggage carrier in collapsed position.

Figure 3 is a vertical section taken on the line 3—3 Figure 1.

Figure 4 is a vertical section taken on the line 4—4 Figure 3.

Figure 5 is a perspective view of the carrier in extended position.

Figure 6 is an elevation of one of the collapsible supports of the carrier, showing the means for latching the carrier in extended position.

Figure 7 is a vertical section through the outer rail of the carrier, showing an applied post.

The luggage carrier comprises an inner rail 2 which is adapted to be secured to the frame of the automobile at the rear thereof by suitable brackets or straps 3, so that the rail extends across the rear end of the automobile. The rail 2 is preferably provided with a recess on its outer side and, for that reason, preferably consists of a channel iron. Attached to and movable with respect to the inner rail is an outer rail 4, which is movable from collapsed position adjacent the inner rail, to extended position. The outer rail 4 moves horizontally and lies in the same horizontal plane in collapsed and extended position. The rail 4 is provided with a recess on its inner side and for that reason is preferably formed of channel iron.

The inner and outer rails are connected by folding supporting members, which, when the carrier is in collapsed position, nest in and are concealed in the recesses in the rails. When the carrier is in collapsed position, the rails are in contact or in substantial contact and the folding supporting members are contained within the chamber formed by the two contiguous channels. The supporting members comprise the two side members 5, preferably formed of channel iron, each side member comprising two pieces of channel iron hinged together at 6 and pivoted at their ends on pins 7 extending through the rails 2 and 4. The hinge 6 lies midway between the two pins 7 and the side member breaks inwardly. The side edges of the flanges of the channel come into contact at the hinge, when the supporting member 5 is in extended position, holding the two pieces of the member in alinement. The two pieces of the side member 5 are latched in alinement by a keeper 8 pivoted to one member and adapted to engage a pin 9 on the other member.

The inner and outer rails are also connected by intermediate supporting members 12 and 13 which are pivoted at their ends to the two rails respectively and which are hinged at their centers. The two connecting members 12 break to the right and the two connecting members 13 break to the left, when the outer rail is moved inward toward collapsed position. Each of the members 12 and 13 is provided adjacent the central pivot with a lug 14 which acts as a stop to hold the folding members in position slightly after the two parts thereof have passed dead center. It is evident that the intermediate toggle members in their dead center positions will spring the rails farther apart than the limiting position of the end members 5 so that they will be retained in substantially the positions shown in Fig. 1. By this construction a substantially rigid frame is formed when the carrier is in extended position. The central supporting member 13 is preferably spaced somewhat below the plane of the adjacent supporting member 12, so that when the carrier is collapsed the folded member 13 will lie below the folded member 12.

The outer rail 4 is provided with seats 15 for receiving removable posts 16, which may be inserted in the seats to form a barrier at the outer side of the carrier, to retain luggage on the carrier. The outer rail is also provided with bands 17 for holding an applied strap which may be passed around the luggage on the carrier. The outer rail is also provided with keepers 18 adapted to engage pins 19 carried by the inner rail, for the purpose of holding the two rails tightly in collapsed position. When the luggage carrier is in collapsed position it serves admirably as a bumper and, due to its compact arrangement, is not unsightly and does not disfigure or mar the appearance of the automobile. When in extended position it also serves as a bumper and provides a rigid platform for the support of luggage.

I claim:

1. A collapsible luggage carrier comprising an inner rail adapted to be secured to a support, an outer rail movable in a plane parallel to said inner rail, a pair of foldable end members for limiting the outward movement of said outer rail, intermediate toggle support members pivotally connected at their ends to said rails and adapted in their dead center position to spring said rails apart farther than the limiting position of said end members, and means on each of said toggles to limit their movement in one direction to a position just past their dead center position.

2. A collapsible luggage carrier comprising an inner rail adapted to be secured to a support, an outer rail movable in a plane parallel to said inner rail, a pair of foldable end members for limiting the outward movement of said outer rail, intermediate toggle support members pivotally connected at their ends to said rails and adapted in their dead center position to spring said rails farther apart than the limiting position of said end members, and means for limiting the movement of each toggle member in one direction to a position just past their dead center position, certain of said toggle members being adapted to be moved in opposite directions to collapse said carrier.

In testimony whereof, I have hereunto set my hand.

EDWARD M. PELS.